US011617002B2

(12) United States Patent
Chen et al.

(10) Patent No.: US 11,617,002 B2
(45) Date of Patent: Mar. 28, 2023

(54) VIDEO INTERACTION PLATFORM

(71) Applicant: Meta Platforms, Inc., Menlo Park, CA (US)

(72) Inventors: Kun Chen, Bellevue, WA (US); Jason Pehr Rubin, Los Angeles, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 17/459,474

(22) Filed: Aug. 27, 2021

(65) Prior Publication Data

US 2023/0069305 A1    Mar. 2, 2023

(51) Int. Cl.
*H04N 21/431* (2011.01)
*H04N 21/478* (2011.01)
*H04N 21/85* (2011.01)
*H04N 21/4788* (2011.01)
*H04N 21/43* (2011.01)
*H04N 21/2187* (2011.01)

(52) U.S. Cl.
CPC ..... *H04N 21/4312* (2013.01); *H04N 21/2187* (2013.01); *H04N 21/4307* (2013.01); *H04N 21/4788* (2013.01)

(58) Field of Classification Search
CPC .. H04N 21/4316; H04N 5/445; H04N 21/431; H04N 21/4788; H04N 21/8453; G06F 9/451; G06Q 50/01
See application file for complete search history.

(56) References Cited

U.S. PATENT DOCUMENTS

| | | | |
|---|---|---|---|
| 10,498,794 B1* | 12/2019 | Keighran | H04N 21/4781 |
| 11,051,067 B1 | 6/2021 | Baxter et al. | |
| 2016/0241929 A1 | 8/2016 | Shenkler | |
| 2016/0366466 A1* | 12/2016 | Shen | G06Q 50/01 |
| 2018/0139257 A1 | 5/2018 | Ninoles et al. | |
| 2019/0138323 A1* | 5/2019 | Chiarella | G06F 3/04886 |
| 2021/0019982 A1* | 1/2021 | Todd | G07F 17/3211 |

OTHER PUBLICATIONS

International Search report and Written Opinion for International Application No. PCT/US2022/041596, dated Nov. 23, 2022, 9 pages.

* cited by examiner

*Primary Examiner* — Alazar Tilahun
(74) *Attorney, Agent, or Firm* — Greenberg Traurig, LLP

(57) ABSTRACT

The disclosed computer-implemented method may include initiating a translucent layer, that includes a user interface element, for displaying over a content layer on a computing device, and receiving, from a content source, video content for the content layer. The method may also include receiving input via the user interface element and sending the input to the content source to direct the content source to modify the video content. The method may further include receiving modified video content from the content source and displaying the modified video content on the content layer. Various other methods, systems, and computer-readable media are also disclosed.

20 Claims, 6 Drawing Sheets

VIDEO INTERACTION PLATFORM

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
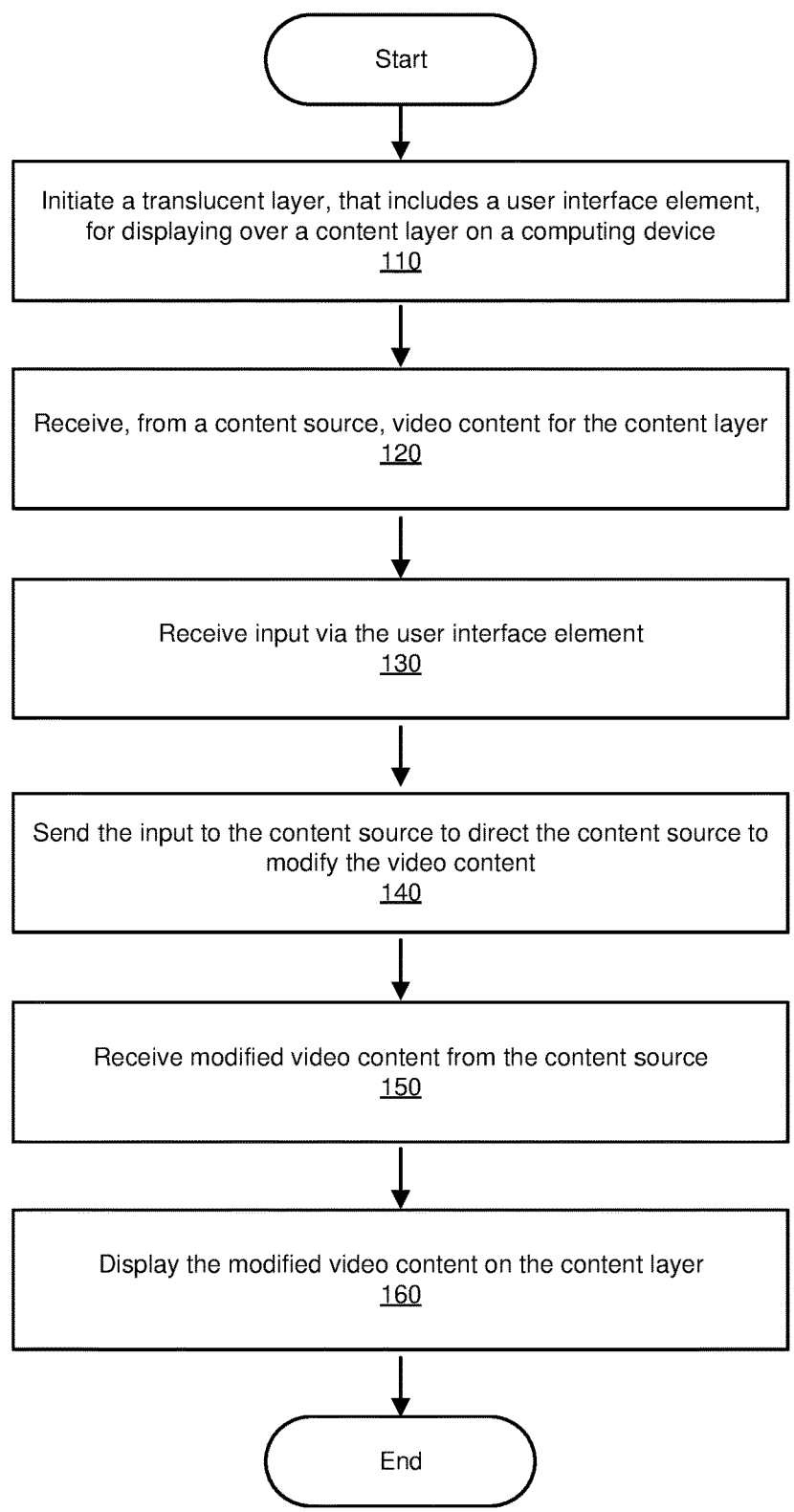
FIG. 1 is a flow diagram of an exemplary method for operating a live interaction platform.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Playing games on computing devices is a popular activity. As games become more popular, watching people playing games is becoming an increasingly popular form of entertainment. Various live streaming platforms allow spectators to stream live gameplay. Such live streaming platforms allow game players to broadcast their gameplay. However, these live streaming platforms may limit spectators to passive viewing.

Certain other live streaming platforms may provide spectators with limited interactive aspects. For example, some live streaming platforms may allow viewers to chat with a content creator. However, such platforms may be limited to certain specific actions (e.g., typing in chat messages), which may or may not bring about a response from the content creator. Moreover, such platforms may be proprietary and custom-built for the specific platform, which may further limit or otherwise hinder development of added interactivity.

The present disclosure is generally directed to a live interaction platform. As will be explained in greater detail below, embodiments of the present disclosure may provide a translucent layer that includes a user interface ("UI") element that may send input from the user interface element to a content source to direct the content source to modify streaming video content. The modified streaming video content may be displayed on a content layer that is overlaid by the translucent layer. The systems and methods described herein may improve the functioning of a computing device by efficiently providing additional interface elements to streaming video without requiring significant computing resources. In addition, the systems and methods described herein may improve the field of content delivery by providing a lightweight API that may provide additional interactivity.

Features from any of the embodiments described herein may be used in combination with one another in accordance with the general principles described herein. These and other embodiments, features, and advantages will be more fully understood upon reading the following detailed description in conjunction with the accompanying drawings and claims.

The following will provide, with reference to FIGS. 1-4, detailed descriptions of a live interaction platform. Detailed descriptions of a method for a live interaction platform are provided with FIG. 1. Detailed descriptions of an example system for a live interaction platform are provided with FIG. 2. Detailed descriptions of an example network environment for a live interaction platform are provided with FIG. 3. Detailed descriptions of an example data flow for a live interaction platform are provided with FIG. 4. Detailed descriptions of example screens for a live interaction platform are provided with FIGS. 5A-B.

FIG. 1 is a flow diagram of an exemplary computer-implemented method 100 for running a live interaction platform. The steps shown in FIG. 1 may be performed by any suitable computer-executable code and/or computing system, including the system(s) illustrated in FIGS. 2 and/or 3. In one example, each of the steps shown in FIG. 1 may represent an algorithm whose structure includes and/or is represented by multiple sub-steps, examples of which will be provided in greater detail below.

As illustrated in FIG. 1, at step 110 one or more of the systems described herein may initiate a translucent layer, that includes a user interface element, for displaying over a content layer on a computing device. For example, a layer module 204 may initiate a translucent layer 222 for displaying over a content layer 224.

In some embodiments, the term "layer" may refer to a data abstraction for separating elements of different applications which may be combined for rendering to a display device. Examples of layers include, without limitation, application windows, user interface layouts, browser frames, tabs, etc. In some examples, the layers themselves may be transparent or translucent so as not to obscure elements from underlying layers.

Figure 2:
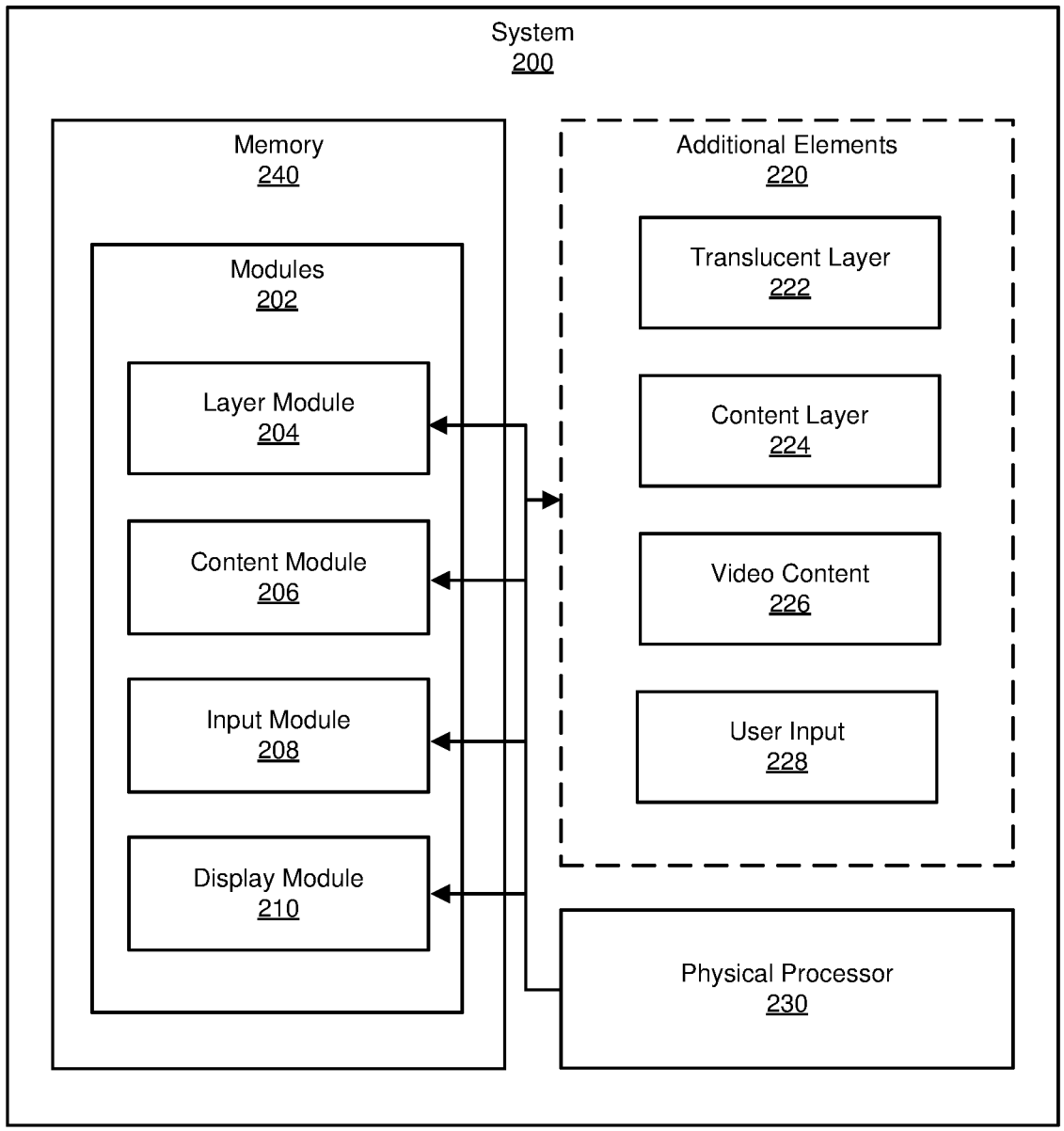
FIG. 2 is a block diagram of an exemplary system for a live interaction platform.

Various systems described herein may perform step 110. For instance, FIG. 2 is a block diagram of an example system 200 for a live interaction platform. As illustrated in this figure, example system 200 may include one or more modules 202 for performing one or more tasks. As will be explained in greater detail herein, modules 202 may include layer module 204, a content module 206, an input module 208, and a display module 210. Although illustrated as separate elements, one or more of modules 202 in FIG. 2 may represent portions of a single module or application.

In certain embodiments, one or more of modules 202 in FIG. 2 may represent one or more software applications or programs that, when executed by a computing device, may cause the computing device to perform one or more tasks. For example, and as will be described in greater detail below, one or more of modules 202 may represent modules stored and configured to run on one or more computing devices, such as the devices illustrated in FIG. 3 (e.g., computing device 302 and/or server 306). One or more of modules 202 in FIG. 2 may also represent all or portions of one or more special-purpose computers configured to perform one or more tasks.

As illustrated in FIG. 2, example system 200 may also include one or more memory devices, such as memory 240.

Memory 240 generally represents any type or form of volatile or non-volatile storage device or medium capable of storing data and/or computer-readable instructions. In one example, memory 240 may store, load, and/or maintain one or more of modules 202. Examples of memory 240 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 2, example system 200 may also include one or more physical processors, such as physical processor 230. Physical processor 230 generally represents any type or form of hardware-implemented processing unit capable of interpreting and/or executing computer-readable instructions. In one example, physical processor 230 may access and/or modify one or more of modules 202 stored in memory 240. Additionally or alternatively, physical processor 230 may execute one or more of modules 202 to facilitate maintain the mapping system. Examples of physical processor 230 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 2, example system 200 may also include one or more additional elements 220, such as translucent layer 222, content layer 224, video content 226, and user input 228. Translucent layer 222, content layer 224, video content 226, and/or user input 228 may be stored on a local storage device, such as memory 240, or may be accessed remotely. Translucent layer 222 may represent a user interface layer that may be significantly translucent so as not to obscure content layer 224, as will be explained further below. Content layer 224 may represent a layer reserved for displaying content such as video content 226. Video content 226 may represent media content streamed from a remote server. User input 228 may represent a user input as received by translucent layer 222, as will be explained further below.

Example system 200 in FIG. 2 may be implemented in a variety of ways. For example, all or a portion of example system 200 may represent portions of example network environment 300 in FIG. 3.

Figure 3:
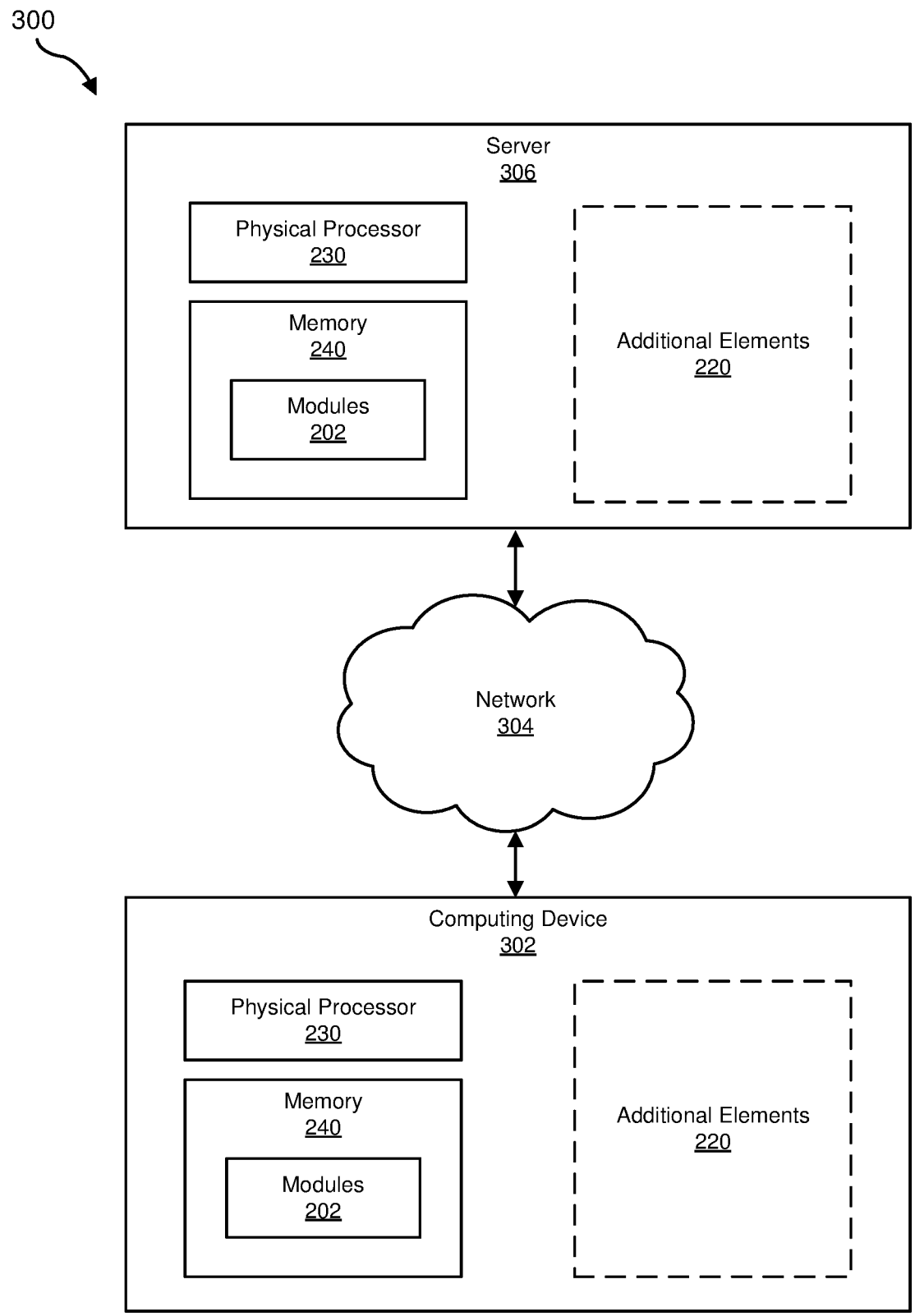
FIG. 3 is a block diagram of an exemplary network for a live interaction platform.

FIG. 3 illustrates an exemplary network environment 300 implementing aspects of the present disclosure. The network environment 300 includes computing device 302, a network 304, and server 306. Computing device 302 may be a client device or user device, such as a mobile device, a desktop computer, laptop computer, tablet device, smartphone, or other computing device. Computing device 302 may include a physical processor 230, which may be one or more processors, memory 240, which may store data such as one or more of additional elements 220.

Server 306 may represent or include one or more servers capable of hosting media content. Server 306 may include a physical processor 230, which may include one or more processors, memory 240, which may store modules 202, and one or more of additional elements 220.

Computing device 302 may be communicatively coupled to server 306 through network 304. Network 304 may represent any type or form of communication network, such as the Internet, and may comprise one or more physical connections, such as LAN, and/or wireless connections, such as WAN.

Computing device 302 and/or server 306 may perform the steps described herein independently or cooperatively. Returning to FIG. 1, the systems described herein may perform step 110 in a variety of ways. In one example, layer module 204 may initiate translucent layer 222 concurrently with or after initiating content layer 224. For example, layer module 204 may initiate translucent layer 222 in response to content layer 224 being initiated. In some examples, layer module 204 may initiate translucent layer 222 before content layer 224. For example, once initiated, translucent layer 222 may initiate and/or request content for content layer 224.

Figure 4:
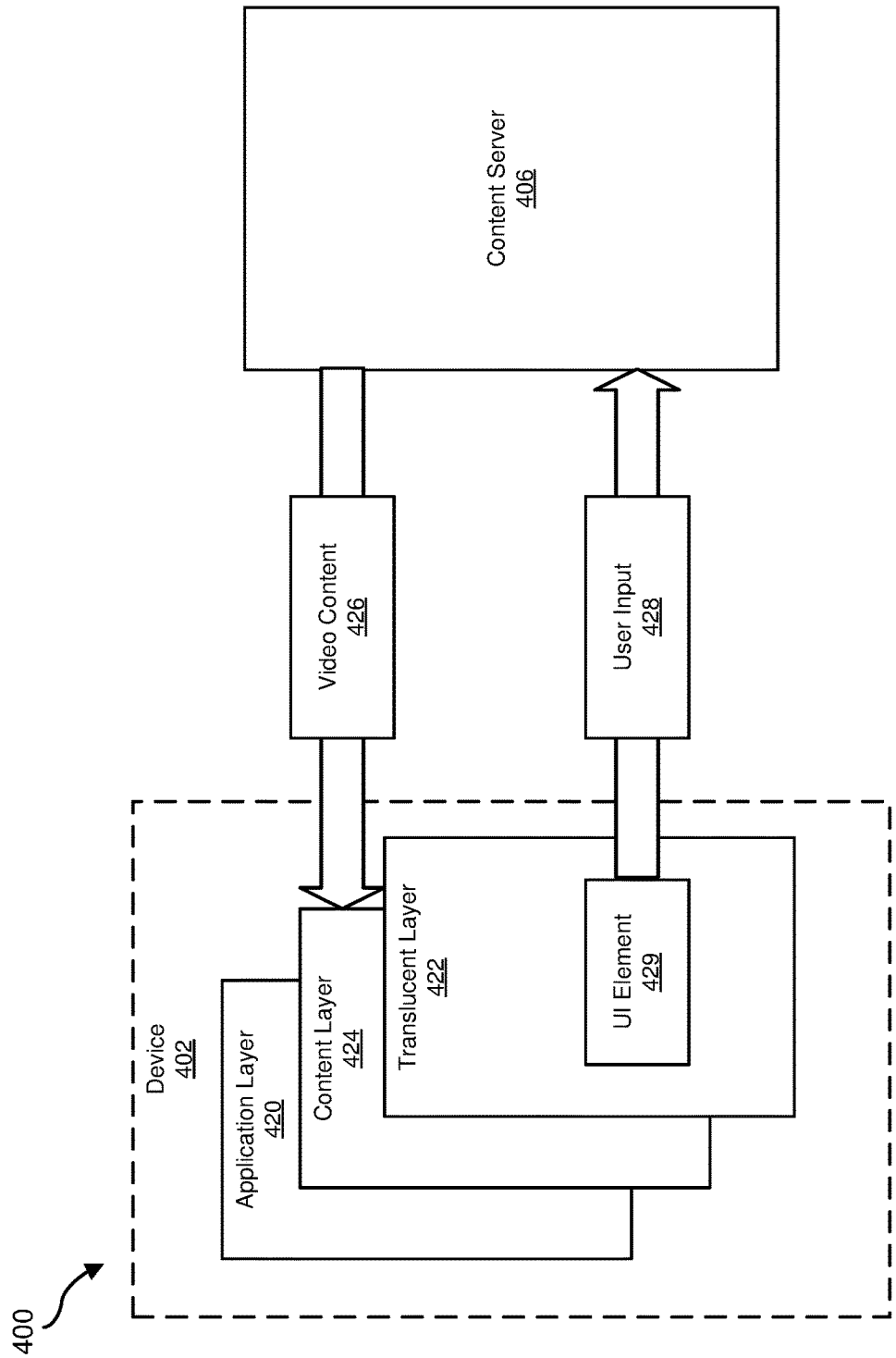
FIG. 4 is a block diagram of an exemplary data flow for a live interaction platform.

The various layers described herein (e.g., translucent layer 222 and content layer 224) may interact with each other directly or indirectly. An example of layer interaction is shown in FIG. 4. FIG. 4 illustrates a data flow 400 for a live interaction platform. FIG. 4 illustrates a device 402, which may correspond to computing device 302, and a content server 406, which may correspond to server 306. Device 402 may include an application layer 420 (which may correspond to one or more of modules 202), a content layer 424 (which may correspond to content layer 224), a translucent layer 422 (which may correspond to translucent layer 222), a UI element 429, video content 426 (which may correspond to video content 226), and a user input 428 (which may correspond to user input 228).

Application layer 420 may correspond to a base application that a user may use to find and navigate to media content, such as streaming video content. Application layer 420 may initiate translucent layer 422 when the user selects desired content. In some examples, translucent layer 422 may initiate content layer 424 and accordingly request the user's desired content. In other examples, application layer 420 may first initiate content layer 424 with the desired content, and subsequently initiate translucent layer 422. As illustrated in FIG. 4, translucent layer 422 may be overlaid onto content layer 424, which in turn may be overlaid onto application layer 420. The overlaying of layers is further illustrated in FIGS. 5A and 5B.

Figure 5A:
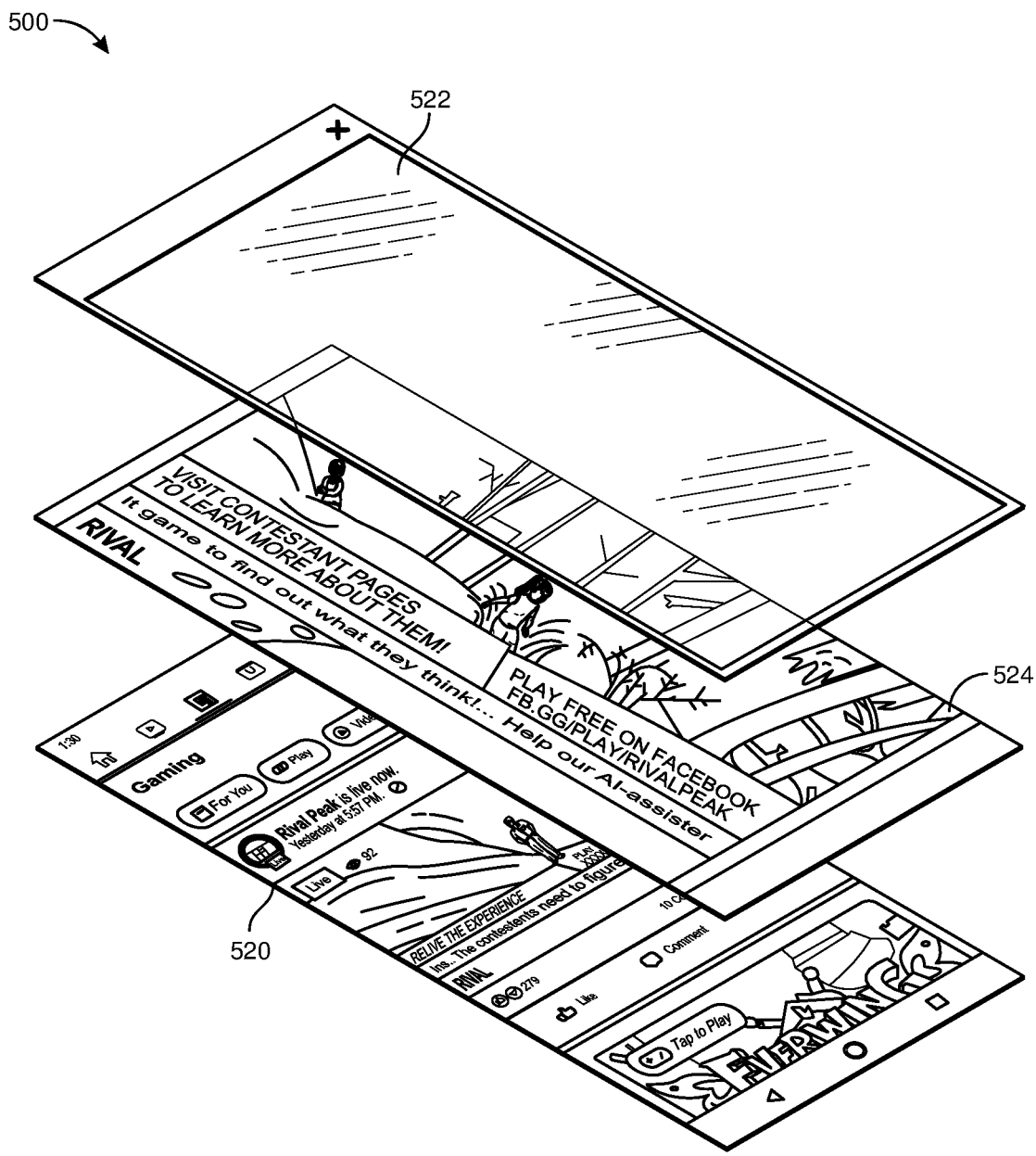
FIGS. 5A-B are example screens for a live interaction platform.

FIG. 5A illustrates a screen 500 having a translucent layer 522 (which may correspond to translucent layer 422 and/or translucent layer 222), a content layer 524 (which may correspond to content layer 424 and/or content layer 224), and an application layer 520 (which may correspond to application layer 420). FIG. 5A illustrates an exploded view of translucent layer 522, content layer 524, and application layer 520 for illustrative purposes. As shown in FIG. 5A, application layer 520 may provide an application that a user may use to select content for viewing. Once the user selects content for viewing, application layer 520 may initiate content layer 524 and/or translucent layer 522 for overlaying on top of application layer 520. As further shown in FIG. 5A, translucent layer 522 may be translucent or transparent so as not to block or obscure the media content playing on content layer 524.

Figure 5B:
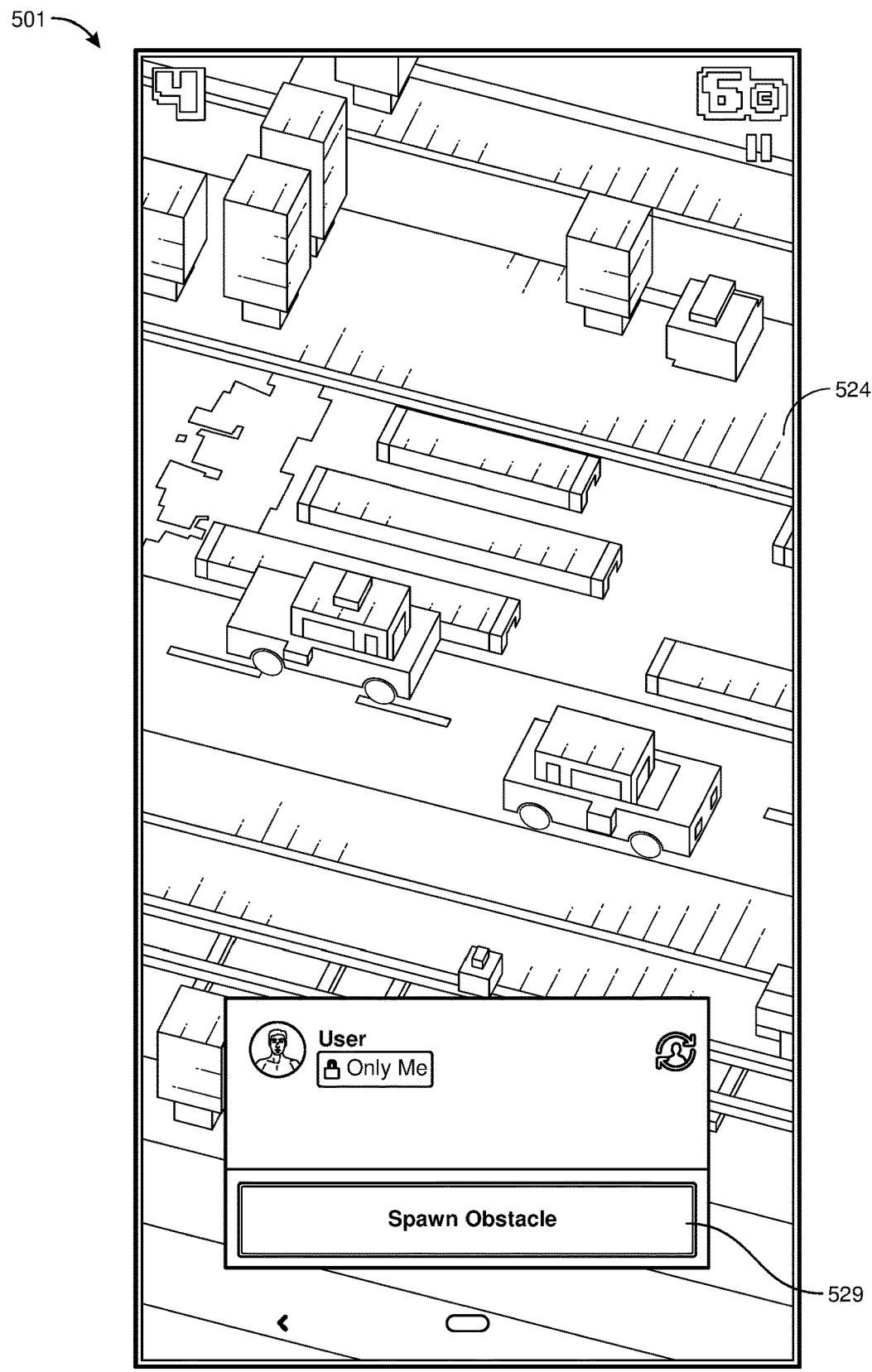

FIG. 5B illustrates a screen 501 in which the various layers may be flattened for display. As will be described further below, FIG. 5B includes a UI element 529, which may correspond to UI element 429.

Turning back to FIG. 1, at step 120 one or more of the systems described herein may receive, from a content source, video content for the content layer. For example, content layer 224 may receive video content 226.

In some embodiments, the term "video content" may refer to any media content that may be delivered from a remote server rather than locally stored media content. Examples of video content include, without limitation, live video, live gameplay of a video game, streaming video, streaming audio, video-on-demand, video files, audio files, etc.

The systems described herein may perform step 120 in a variety of ways. In one example, content module 206 may (as part of translucent layer 222 and/or content layer 224) request video content 226 from server 306.

In some examples, application layer 420, content layer 424, and/or translucent layer 422 may request video content 426 from content server 406. For example, the user may select live streaming gameplay of a video game, a live stream video, and/or an on-demand video via application layer 420. Content server 406 may deliver the desired content (e.g., video content 426) to content layer 424. In some examples, the requesting layer (e.g., one or more of translucent layer 422, application layer 420, and content layer 424) may initiate a streaming session with content server 406.

As shown in FIG. 5A, application layer 520 may correspond to an application providing the user with various media content options. Once the user selects the desired media content for viewing, application layer 520 may request the desired content, initiate content layer 524 to play the desired content, and overlay translucent layer 522 over content layer 524. Alternatively, application layer 520 may initiate translucent layer 522 with instructions for playing the desired content. Translucent layer 522 may then request the desired content and initiate content layer 524 under translucent layer 522 for playing the requested content.

Returning to FIG. 1, at step 130 one or more of the systems described herein may receive input via the user interface element. For example, input module 208 may receive user input 228 via a UI element of translucent layer 222.

In some embodiments, the term "UI element" may refer to any aspect of a UI that may allow interaction with the user. Examples of UI elements include, without limitation, buttons, text fields, controls, menus, as well as inputs from user input devices (e.g., touchscreens, keyboards, mice, etc.). Such UI elements may be displayed on a device's screen without taking up an entirety of the screen.

The systems described herein may perform step 130 in a variety of ways. In one example, translucent layer 422 may be significantly transparent except for UI element 429 such that the user may see video content 426 on content layer 424 along with UI element 429 overlaid onto the content. Translucent layer 422 may be minimally intrusive to the user's viewing of content layer 424 while providing one or more visual controls via UI element 429. The user may input user input 428 via UI element 429.

For example, FIG. 5B shows UI element 529 which may cover a portion of content layer 524. As translucent layer 522 may be translucent except for UI element 529, FIG. 5B may show only UI element 529 over content layer 524. UI element 529 may include a button (e.g., "Spawn Obstacle") but may include additional elements to provide the user with information, such as the user's profile information as in FIG. 5B. UI element 529 may allow the user to provide an input (e.g., user input 428 in FIG. 4) while viewing media content on content layer 524.

In some examples, user input 428 may modify a gameplay of the video game. For example, user input 428 may include an instruction to change aspects of the gameplay, such as a location, visual and/or audible aspects, spawning additional obstacles and/or enemies, selecting and/or voting on game options, other gameplay parameters, etc. In FIG. 5B, content layer 524 may include a live stream of video gameplay. UI element 529 may allow the user to affect the gameplay by spawning additional obstacles for the game player to avoid.

In some examples, user input 428 may include a prompt for the live video. For example, user input 428 may include a textual prompt (e.g., a question for the live streamer, an answer), a user reaction (such as a like, applause, or other reaction), a voting option, etc.

In other examples, user input 428 may provide other interactive options for the user to interact with video content 426 as may be appropriate. User input 428 may correspond to an instruction that may result in a live modification to video content 426.

In yet other examples, video content 426 may correspond to produced video content (e.g., video-on-demand) rather than a live stream. In such examples, user input 428 may include instructions for modifying one or more parameters relating to the video content, such as application of filters, selection of angles or points-of-view, selection of chapters, etc. Additionally or alternatively, user input 428 may provide added interactivity related to video content 426, such as providing interactivity (e.g., additional information, links to related products, etc.) that may complement a viewing experience of video content 426. For example, if video content 426 corresponds to a cooking video, UI element 429 may provide a button allowing the user to see the recipe (e.g., such that user input 428 corresponds to opening a link), and/or adding recipe ingredients to a shopping cart.

At step 140 one or more of the systems described herein may send the input to the content source to direct the content source to modify the streaming video content. For example, input module 208 may send user input 228 to server 306 to direct server 306 to modify video content 226.

The systems described herein may perform step 140 in a variety of ways. In one example, translucent layer 422, after receiving user input 428 via UI element 429, may send user input 428 to content server 406. User input 428 may include an identifier to identify what media (e.g., live video session, game session, etc.) is being displayed in content layer 424. In some examples, translucent layer 422 may convert or otherwise reformat user input 428 to be suitable for use by content server 406. Based on user input 428, content server 406 may identify and accordingly modify video content 426.

In one example, if video content 426 corresponds to live gameplay and user input 428 includes instructions for modifying an aspect of the gameplay, content server 406 may accordingly modify the gameplay (e.g., adding new obstacles, etc.) based on user input 428. The game player may then notice the modification and react accordingly such that video content 426 may be modified to include a live reaction to the modified gameplay. For instance, in FIG. 5B, when the user selects the "Spawn Obstacle" button (e.g., UI element 529), translucent layer 522 may send a corresponding instruction to the game server to spawn obstacles that the game player may react to.

In another example, if video content 426 corresponds to a live video stream and user input 428 includes instructions for prompting the live streamer, content server 406 may accordingly prompt the live streamer (e.g., present the prompt to the live streamer) based on user input 428. The live streamer may then notice the prompt and react accordingly such that video content 426 may be modified to include a live reaction to the prompt.

In yet another example, if video content 426 corresponds to statically produced video such as video-on-demand (instead of a live stream) and user input 428 includes instructions for modifying the video content, content server 406 may accordingly apply the instructions to video content 426.

In some examples, video content 426 and/or content server 406 may be associated with a third party with respect to application layer 420. In such examples, application layer 420 and/or translucent layer 422 may provide an API that may allow content server 406 to receive instructions (e.g., user input 428) for modifying video content 426. The third party may configure content server 406 for a much or as little interactivity functionalities as desired. For example, in FIG. 5A, application layer 520 and translucent layer 522 may provide an API that various third-party servers may interface with for interactive functionalities.

In addition, although user input 428 may direct content server 406 to modify or otherwise update video content 426, in some examples, such modification may not produce an immediately noticeable change. For example, even after content server 406 modifies aspects of the live stream, the live streamer may choose to ignore or may not noticeably react to the modification.

At step 150 one or more of the systems described herein may receive modified streaming video content from the content source. For example, display module 210 may receive video content 226.

The systems described herein may perform step 150 in a variety of ways. In one example, content layer 424 may receive, from content server 406, video content 426 that has been modified by content server 406 in direct and/or indirect response to user input 428. Although FIG. 4 presents video content 426 as a discrete instance of content, in some examples content server 406 may be continuously delivering video content 426, which may be updated in real time in response to user input 428 as described herein. For example in FIGS. 5A and 5B, content layer 524 may continuously play video content as received from the content server.

At step 160 one or more of the systems described herein may display the modified streaming video content on the content layer. For example, display module 210 may display video content 226 on content layer 224. FIGS. 5A and 5B illustrate how content may be displayed on content layer 524.

The systems described herein may perform step 160 in a variety of ways. In one example, translucent layer 422 may control how video content 426 is displayed on content layer 424, rather than application layer 420 or content layer 424. For example, translucent layer 422 may control at least one of a size or a location of the streaming video content rendered in the content layer. In such examples, content layer 424 may act as a placeholder layer for arranging content as controlled by translucent layer 422. Content layer 424 may be unaware that its content may be rendered differently. For instance, content layer 424 or the content itself may not natively allow resizing and/or relocating the content. Translucent layer 422 may provide such functionality by controlling how content layer 424 itself is rendered.

In some examples, translucent layer 422 may request a second streaming video content for the content layer and display video content 426 and the second streaming video content on content layer 424. For example, the user may select (e.g., via application layer 420 and/or translucent layer 422) additional content for side-by-side viewing (or other arrangements such as overlapping windows) with video content 426. Alternatively, translucent layer 422 may display the second streaming video content on content layer 424 by replacing video content 426 with the second streaming video content.

In addition, translucent layer 422 may read a time code from video content 426 and synchronize translucent layer 422 with content layer 424 using the time code. For example, translucent layer 422 may update UI element 429 to synchronize with video content 426 (e.g., by updating a location and/or a visibility of UI element 429 to align with timing cues in video content 426).

Thus, the systems and methods described herein may provide a live interaction platform that provides content viewers with increased interactivity with live content creators. The various layers, for example application layer 520, content layer 524, and translucent layer 522 as illustrated in FIG. 5A, may interact with content servers to provide interactivity. FIG. 5B illustrates an example of a user viewing live video gameplay. As the user views the live gameplay (e.g., on content layer 524), the user may be interested in active interaction rather than passive viewing. Using UI element 529, the user may instruct the game server to spawn more obstacles in the game session that the user is viewing. The user may then see the added obstacles (e.g., on content layer 524) and also see how the game player reacts to the new obstacles.

The present disclosure is directed to enabling interactivity with video streaming. A live streaming experience, such as live streaming a someone playing a video game, is traditionally limited to either playing the game, or watching someone play the game, representing two ends of a spectrum between immersion and interactivity. To provide an experience between these extremes (e.g., by adding interactivity to live stream viewing), developers would have to build an application specifically providing such features. The present disclosure provides a flexible platform for adding interactivity to any video without being limited to a particular application. A translucent layer may be overlaid onto a video layer, providing a user interface for interactivity. The translucent layer may communicate with a server to enable interactions with video content. For example, a live stream viewer watching a live stream of a video game may, via the user interface, be able to control aspects of the game environment and see the game player respond to changes in real time. The translucent layer may further control or modify the video layer, such as resizing the video, swapping different video streams, playing multiple video streams, etc.

The translucent layer may be a translucent webview overlaid on top of a variable number of live video components. The translucent webview may set a state of the video, allow creation and/or destruction of video components, etc. The third-party servers associated with the live stream may communicate with their own servers to update the live stream based on inputs and/or instructions provided by the translucent webview. For example, the translucent webview may provide a viewer watching live gameplay with buttons for spawning more enemies in the game being viewed. When the viewer clicks one of the buttons, the translucent webview may send an event (e.g., a spawn enemy event) to the game server that may accordingly spawn more enemies. The content may change because the streamer may see the newly spawned enemies and react accordingly, updating the live stream based on the viewer's input.

EXAMPLE EMBODIMENTS

Example 1: A computer-implemented method comprising: (i) initiating a translucent layer, that includes a user interface element, for displaying over a content layer on a computing device; (ii) receiving, from a content source, video content for the content layer; (iii) receiving input via the user interface element; (iv) sending the input to the content source to direct the content source to modify the video content; (v) receiving modified video content from the content source; and (vi) displaying the modified video content on the content layer.

Example 2: The method of Example 1, wherein the video content includes live streaming gameplay of a video game.

Example 3: The method of Example 2, wherein the input modifies a gameplay of the video game and the modified video content includes a live reaction to the modified gameplay.

Example 4: The method of Example 1, 2, or 3, wherein the video content includes live streaming video.

Example 5: The method of Example 4, wherein the input includes a prompt for the live streaming video and the modified video content includes a live reaction to the prompt.

Example 6: The method of any of Examples 1-5, wherein the translucent layer controls at least one of a size or a location of the video content rendered in the content layer.

Example 7: The method of any of Examples 1-6, further comprising: requesting, by the translucent layer, a second video content for the content layer; and displaying the video content and the second video content on the content layer.

Example 8: The method of any of Examples 1-7, further comprising: requesting, by the translucent layer, a second video content for the content layer; and displaying the second video content on the content layer by replacing the video content.

Example 9: The method of any of Examples 1-8, further comprising: reading a time code from the video content; and synchronizing the translucent layer with the content layer using the time code.

Example 10: A system comprising: at least one physical processor; physical memory comprising computer-executable instructions that, when executed by the physical processor, cause the physical processor to: (i) initiate a translucent layer, that includes a user interface element, for displaying over a content layer on a computing device; (ii) receive, from a content source, video content for the content layer; (iii) receive input via the user interface element; (iv) send the input to the content source to direct the content source to modify the video content; (v) receive modified video content from the content source; and (vi) display the modified video content on the content layer.

Example 11: The system of Example 10, wherein: the video content includes live streaming gameplay of a video game; and the input modifies a gameplay of the video game and the modified video content includes a live reaction to the modified gameplay.

Example 12: The system of Example 10 or 11, wherein: the video content includes live streaming video; and the input includes a prompt for the live streaming video and the modified video content includes a live reaction to the prompt.

Example 13: The system of Example 10, 11, or 12, wherein the translucent layer controls at least one of a size or a location of the video content rendered in the content layer.

Example 14: The system of any of Examples 10-13, wherein the instructions further comprise instructions that cause the physical processor to: request, by the translucent layer, a second video content for the content layer; and display the video content and the second video content on the content layer.

Example 15: The system of any of Examples 10-14, wherein the instructions further comprise instructions that cause the physical processor to: request, by the translucent layer, a second video content for the content layer; and display the second video content on the content layer by replacing the video content.

Example 16: The system of any of Examples 10-16, wherein the instructions further comprise instructions that cause the physical processor to: read a time code from the video content; and synchronize the translucent layer with the content layer using the time code.

Example 17: A non-transitory computer-readable medium comprising one or more computer-executable instructions that, when executed by at least one processor of a computing device, cause the computing device to: (i) initiate a translucent layer, that includes a user interface element, for displaying over a content layer on a computing device; (ii) receive, from a content source, video content for the content layer; (iii) receive input via the user interface element; (iv) send the input to the content source to direct the content source to modify the video content; (v) receive modified video content from the content source; and (vi) display the modified video content on the content layer.

Example 18: The non-transitory computer-readable medium of Example 17, wherein: the video content includes live streaming gameplay of a video game; and the input modifies a gameplay of the video game and the modified video content includes a live reaction to the modified gameplay.

Example 19: The non-transitory computer-readable medium of Example 17 or 18, wherein: the video content includes live video; and the input includes a prompt for the live video and the modified video content includes a live reaction to the prompt.

Example 20: The non-transitory computer-readable medium of Example 17, 18, or 19, wherein the translucent layer controls at least one of a size or a location of the video content rendered in the content layer.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive user input data to be transformed, transform the user input data, output a result of the transformation to instruct a content server, use the result of the transformation to receive updated video content, and store the result of the transformation to display the updated video content. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   initiating, by an application layer on a computing device, a translucent layer over the application layer that includes a user interface element;
   requesting, by the translucent layer, video content;
   initiating, by the translucent layer, a content layer for displaying the video content on the computing device, wherein the translucent layer is displayed over the content layer;
   receiving, from a content source, the requested video content for displaying on the content layer;
   receiving input via the user interface element;
   sending the input to the content source to direct the content source to modify the video content;
   receiving modified video content from the content source; and
   displaying the modified video content on the content layer.

2. The method of claim 1, wherein the video content includes live streaming gameplay of a video game.

3. The method of claim 2, wherein the input modifies a gameplay of the video game and the modified video content includes a live reaction to the modified gameplay.

4. The method of claim 1, wherein the video content includes live streaming video.

5. The method of claim 4, wherein the input includes a prompt for the live streaming video and the modified video content includes a live reaction to the prompt.

6. The method of claim 1, wherein the translucent layer controls at least one of a size or a location of the video content rendered in the content layer.

7. The method of claim 1, further comprising:
   requesting, by the translucent layer, a second video content for the content layer; and
   displaying the video content and the second video content on the content layer.

8. The method of claim 1, further comprising:
   requesting, by the translucent layer, a second video content for the content layer; and
   displaying the second video content on the content layer by replacing the video content.

9. The method of claim 1, further comprising:
   reading a time code from the video content; and
   synchronizing the translucent layer with the content layer using the time code.

10. A system comprising:
    at least one physical processor; and
    physical memory comprising computer-executable instructions that, when executed by the physical processor, cause the physical processor to:
       initiate, by an application layer of the system, a translucent layer over the application layer that includes a user interface element;
       request, by the translucent layer, video content;
       initiate, by the translucent layer, a content layer for displaying the video content on the system, wherein the translucent layer is displayed over the content layer;
       receive, from a content source, the requested video content for displaying on the content layer;
       receive input via the user interface element;
       send the input to the content source to direct the content source to modify the video content;

receive modified video content from the content source; and display the modified video content on the content layer.

11. The system of claim 10, wherein:

the video content includes live streaming gameplay of a video game; and the input modifies a gameplay of the video game and the modified video content includes a live reaction to the modified gameplay.

12. The system of claim 10, wherein:

the video content includes live streaming video; and the input includes a prompt for the live video and the modified video content includes a live reaction to the prompt.

13. The system of claim 10, wherein the translucent layer controls at least one of a size or a location of the video content rendered in the content layer.

14. The system of claim 10, wherein the instructions further comprise instructions that cause the physical processor to:

request, by the translucent layer, a second video content for the content layer; and display the video content and the second video content on the content layer.

15. The system of claim 10, wherein the instructions further comprise instructions that cause the physical processor to:

request, by the translucent layer, a second video content for the content layer; and display the second video content on the content layer by replacing the video content.

16. The system of claim 10, wherein the instructions further comprise instructions that cause the physical processor to:

read a time code from the video content; and synchronize the translucent layer with the content layer using the time code.

17. A non-transitory computer-readable medium comprising one or more computer-executable instructions that, when executed by at least one processor of a computing device, cause the computing device to:

initiate, by an application layer on the computing device, a translucent layer over the application layer that includes a user interface element;

request, by the translucent layer, video content;

initiate, by the translucent layer, a content layer for displaying the video content on the computing device, wherein the translucent layer is displayed over the content layer;

receive, from a content source, the requested video content for displaying on the content layer;

receive input via the user interface element;

send the input to the content source to direct the content source to modify the video content;

receive modified video content from the content source; and display the modified video content on the content layer.

18. The non-transitory computer-readable medium of claim 17, wherein:

the video content includes live streaming gameplay of a video game; and the input modifies a gameplay of the video game and the modified video content includes a live reaction to the modified gameplay.

19. The non-transitory computer-readable medium of claim 17, wherein:

the video content includes live streaming video; and the input includes a prompt for the live video and the modified video content includes a live reaction to the prompt.

20. The non-transitory computer-readable medium of claim 17, wherein the translucent layer controls at least one of a size or a location of the video content rendered in the content layer.

* * * * *